United States Patent [19]

Hill

[11] 4,054,155

[45] Oct. 18, 1977

[54] HYDRAULIC ACTUATED CONTROL VALVE

[76] Inventor: Ralph W. Hill, 2163 S. Sandusky, Tulsa, Okla. 74114

[21] Appl. No.: 664,500

[22] Filed: Mar. 8, 1976

Related U.S. Application Data

[63] Continuation of Ser. No. 500,702, Aug. 26, 1974, abandoned.

[51] Int. Cl.² .................................... F16K 31/122
[52] U.S. Cl. .................................. 137/625.48; 60/432; 60/481; 251/25
[58] Field of Search .................. 60/432, 477, 481; 137/625.48; 251/25

[56] References Cited

U.S. PATENT DOCUMENTS

| | | | |
|---|---|---|---|
| 337,118 | 3/1886 | Belden | 60/473 |
| 1,244,317 | 10/1917 | Gaffney | 60/481 X |
| 2,399,294 | 4/1946 | Ray | 60/432 |
| 2,414,484 | 1/1947 | Page | 60/481 |
| 2,597,050 | 5/1952 | Audemar | 60/536 |
| 2,897,650 | 8/1959 | Carlson | 60/477 |
| 3,120,103 | 2/1964 | Beard et al. | 60/432 X |
| 3,175,500 | 3/1965 | Zeigler | 60/432 X |
| 3,648,718 | 3/1972 | Curran | 251/282 X |
| 3,825,091 | 7/1974 | Geselbracht et al. | 60/477 X |
| 3,951,170 | 4/1976 | Hill | 137/625.48 |

FOREIGN PATENT DOCUMENTS

| | | | |
|---|---|---|---|
| 1,257,145 | 2/1961 | France | 251/282 |
| 2,128,860 | 12/1972 | Germany | 60/477 |
| 318,010 | 1/1957 | Switzerland | 60/477 |

Primary Examiner—Alan Cohan
Assistant Examiner—Gerald A. Michalsky
Attorney, Agent, or Firm—Head, Johnson & Chafin

[57] ABSTRACT

This invention describes a valve in which the flow gate is operated by a piston in a hydraulic cylinder. The piston is forced axially, against the resistance of a coiled spring, by means of hydraulic fluid pressure provided by a motor driven pump. Electrical limit switches are provided on the movement of the piston. A check valve is provided in the output of the pump so that once the gate has been moved to the desired position as set by the limit switch, the motor will be stopped and the piston will remain in its position. To reset the piston to its original position, a solenoid by-pass valve is provided which is energized when the motor is energized, and when de-energized, provides a bypass between the cylinder and a sump, so that the pressure on the piston is released to atmospheric and the spring will force the piston back to its starting point.

5 Claims, 3 Drawing Figures

HYDRAULIC ACTUATED CONTROL VALVE

This is a continuation of application Ser. No. 500,702, filed Aug. 26, 1974, now abandoned.

BACKGROUND OF THE INVENTION

This invention is in the field of fluid valves. More particularly, it is in the field of remotely controlled valves. Still more particularly, it is concerned with a remotely controlled valve having a minimum of power requirements.

In the prior art there are many types of valves such as gate, globe, butterfly, and ball valves and there are many types of operators for remote control, such as pneumatic, hydraulic, electro-mechanical, and electro-hydraulic. Some of the operators are "fail safe" in the sense that failure of power to the actuator will cause the valve to return to the original position. Some of the valves are balanced, in the sense that the difference between upstream and downstream pressure on the valve does not affect the actuating force required, or has a minor or minimum effect on the actuating force. This valve is unique in that it is fully balanced (except for the slight unbalance due to pressure on the stem cross sectional area) in both the two-way and three-way version. Since the valve is balanced, it requires minimum actuating force, making it possible to use a smaller, lighter, less expensive, and less power consuming actuator.

SUMMARY OF THE INVENTION

The above objects are realized and the limitations of the prior art devices are overcome in this invention by the use of a valve operating mechanism in which the hydraulic cylinder is powered by a relatively lower power motor and hydraulic pump, so that the movement of the piston that closes or opens the valve is operated at the rate of flow of fluid from the pump. Thus, the power requirement to drive the pump can be reduced to a minimum. Closure of the valve is caused by movement of the piston in one direction under hydraulic force, and opening of the valve is caused by the piston moving in the opposite direction (or vice versa) under the force of a coiled spring, once the fluid pressure is released on the piston.

The valve consists essentially of a cylindrical tubular gate which is moved by means of the actuator to seal off each form of port in turn as it passes through elastomer ring seals above and below each port. Since, when sealing a port, the differential pressure between upstream and downstream acts uniformly around the external surface of the tube, there is no net force acting to push the tube upward or downward, so that actuator is unaffected by this net force.

Other types of valve mechanisms can, of course, be used with the control and actuating mechanism of this invention.

These and other objects of this invention and a better understanding of the principles and details of the invention will be evident from the following description taken in conjunction with the appended drawings, in which:

DESCRIPTION OF THE PREFERRED EMBODIMENT

Figure 1:
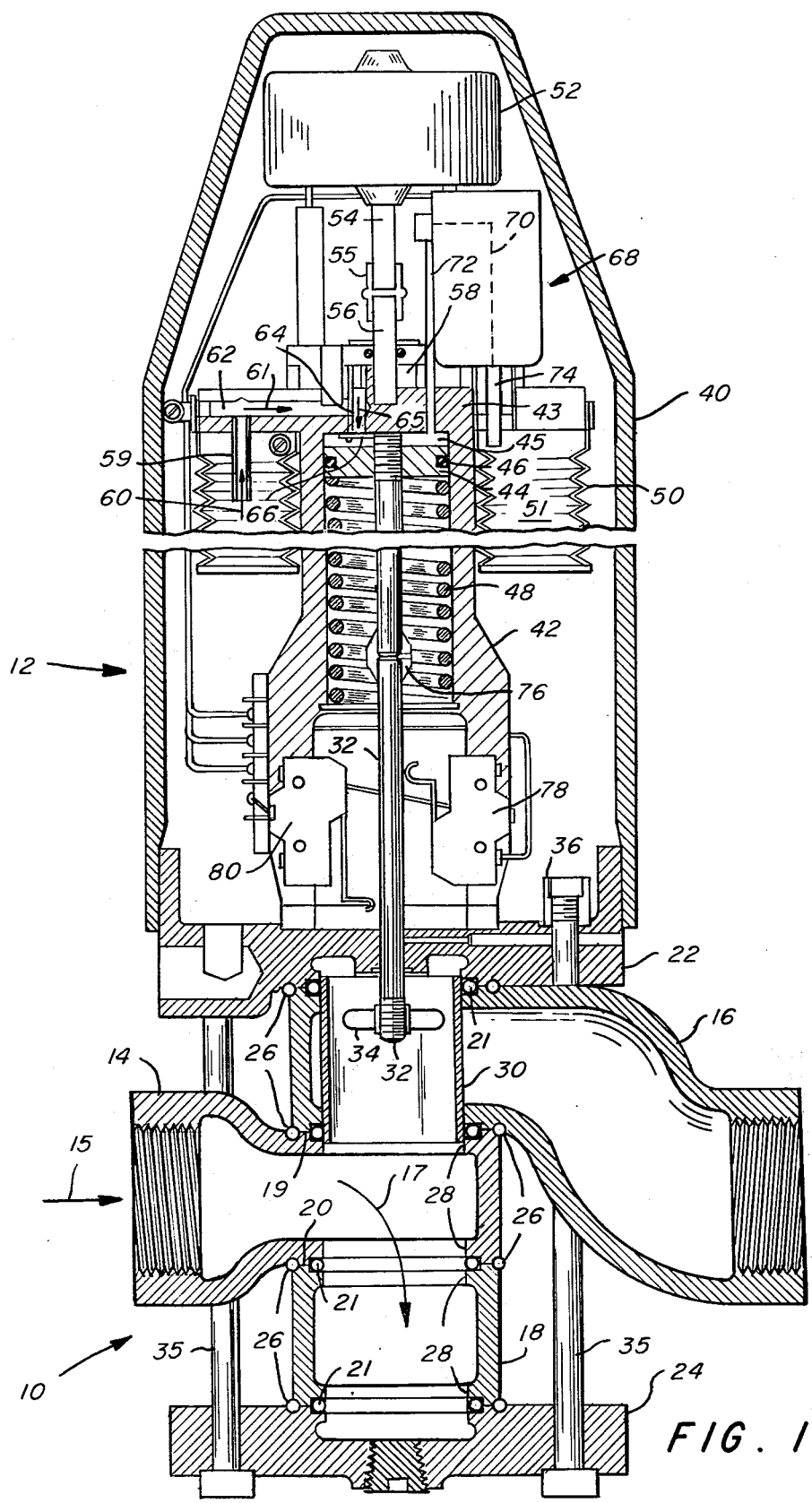
FIG. 1 represents in cross section an assembly view of the valve and the control mechanism.

Referring now to FIG. 1, the numeral 10 indicates generally the fluid conduits and closure means of the valve. Numeral 12 indicates generally the hydraulic control system for the operation of the valve.

This valve is designed as a three-way valve in which an input pipe can be connected to either one or the other of two outlet pipes or can be shut off completely. In another assembly the valve can be made into a dual opening valve in which an inlet and a single outlet are provided, with means to control the flow between the inlet and the outlet. The fluid control portion is made up of three separate parts. Numeral 14 represents the input, numeral 16 represents one output and numeral 18 represents another output. These three parts are stacked one, on the other, with matching machined faces 19 and 20. There are two end plates 22 and 24, again with matched faces, so as to seal the top and bottom of the valve cylindrical bore. The entire stack of five parts is held together by bolts 35 and nuts 36 between the bottom and the top plates. The three central portions are bored as a valve cylinder of a precise diameter 28, and these separate parts are held in precise alignment by means of guide rings 26. Thus, while each of the parts can be rotated and they can be separated and reassembled quickly, they will always fit in perfect alignment because of the guide rings 26 and the appropriate seats. There is a sliding gate 30 which comprises a tubular section with an internal spider 34, to which is attached an operating rod 32. As this gate slides inside the previously bored cylindrical portion 28 it can close off one or the other of the three sections of the fluid portion of the valve. Seals, such as the O-rings 21 seal the outside surface of the gate 30 to the cylindrical openings in the valve parts.

As shown in FIG. 1 the gate is in its uppermost position and closes off the connection to the outlet pipe 16. Fluid flowing into the inlet pipe 14 in accordance with the arrow 15 will then flow downward according to the arrow 17 into the lower portion 18 and out through a pipe connection which is not shown since it is turned away from view. Fluid from inlet pipe 14 cannot flow through outlet pipe 16 as it is blocked by gate 30. When the gate 30 is moved to its middle position, that is, halfway between its present position and its lowermost position, it will shut off the flow 15 of the input section 14. There will be a connection between outlet 16 and outlet 18, but there will be no inlet flow in accordance with the arrow 15.

The gate or slider 30 of the valve has three principle positions. Its uppermost position, such as shown in FIG. 1 where the outlet 16 has been shut off; a middle position where it closes off the flow of the input section 14; and a lowermost or bottom position in which it closes off the flow indicated by arrow 17 through the lowermost outlet 18. The control system 12 is designed so as to operate the gate 30 between these three positions. Its normal rest position is as shown.

The control system involves a casing 40 which fastens to the top plate 22 and houses the control mechanism. There is a cylinder structure 42 which has a top plate 43. On the inside of the cylinder there is a position 44 and a seal ring 46. The space above the piston in the cylinder is labeled numeral 45. There are two pipe connections to the cylinder through the top plate 43. One of them is a pipe 72 which connects to a solenoid valve indicated by numeral 68, which will be discussed later in connection with FIG. 2. There is another pipe 64 which is connected to a fluid pump 58 which is driven by the motor 52. The motor shaft 54 has a coupling 55 which connects it to the pump shaft 56 which drives the pump 58. The pump is designed to take fluid from the sump 51 which is formed of a flexible elastomer type container 50 supported below the top plate 43. The pump takes fluid through a pipe 59 which dips into the sump and, in accordance with the flow direction of the arrows 60 and 61 through a horizontal conduit 62 in the top plate, through the pump and out through a pipe 64 into the space 45 of the cylinder. This flow goes through a check valve 66 so that the operation of the pump can only carry fluid from the sump to the cylinder. As fluid is pumped into the cylinder the piston is moved downwardly against the resistance of a coil spring 48, and the check valve prevents any fluid from returning to the sump through the pump.

When the valve is to be operated, power is supplied to the motor, which starts the pump, which pumps fluid above the piston and causes the piston to move downwardly. Simultaneously power is supplied to solenoid 68, closing the by-pass between sump 50 and space 45 above piston 44. There is a cylindrical cam 76 attached to the piston rod 32. As the piston rod moves down, the gate 30 moves with it, tending to move to the middle position to shut off the flow in the inlet. The cam 76 operates a slider on a limit switch 78, which, when the piston is in its intermediate position opens the circuit to the motor and stops the motor. The valve now is in the intermediate position shutting off the inlet.

There is a second limit switch 80, which is positioned below the switch 78. If it is desired to move the gate 30 to the bottom position, electrical power is then supplied through the switch 80 to the motor which causes it to pump additional fluid into the cylinder and to push the piston downward until switch 80 is opened by the movement of the cam 76. At that time, of course, the gate 30 will be in its lowermost position, shutting off the outlet 18 and permitting flow from the inlet 14 to the outlet 16.

When it is desired to move the gate 30 to its uppermost position from its lowermost position, fluid must be released from the space 45 above the piston. Since it cannot return through the pump because of its check valve 66, a solenoid valve 68 is provided so that a continuous passage can be provided through pump 72 connected to the space 45, internal passage 70 in the solenoid valve, and outlet pipe 74 which is connected to the sump 50. When the solenoid valve is opened by de-energizing the coil the excess pressure in the cylinder is released and the coil spring 48 then forces the piston back to the top position where it can, in accordance with the previous discussion, be moved back down to any desired preselected position.

Figure 2:
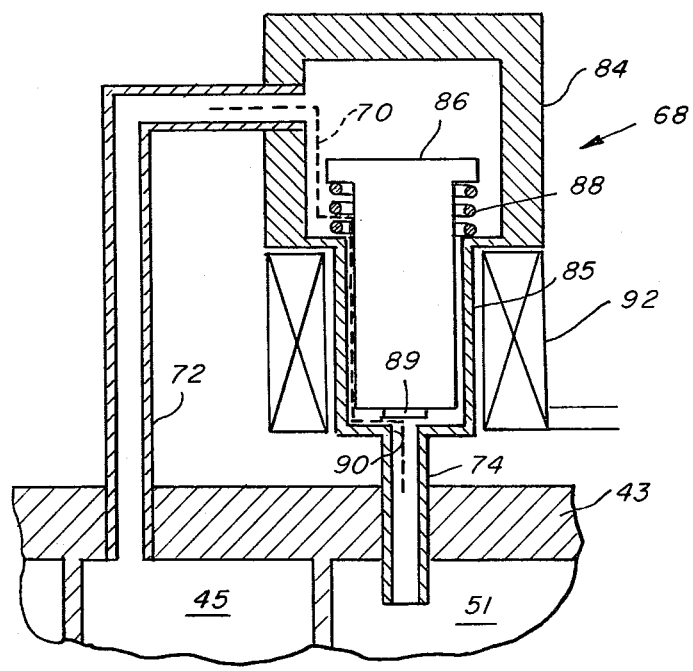
FIG. 2 represents a detail view in section of the solenoid valve and its connecting pipes.

Referring now to FIG. 2 the top plate 43 is shown with a portion of the cylinder space 45 and the sump space 51. The pipe 72 is shown connecting the cylinder space to the solenoid valve 68 and the pipe 74 is shown connected to the sump space 51. The solenoid itself has a chamber 84 with a reduced diameter thin-wall portion 35, to which the pipe 74 is connected. The connections between the pipe 74 and the section 85 is a valve seat 90. This is closed by an elastomer disc 89 which is supported by a plunger 86 made of ferromagnetic material. This plunger is restrained downward in movement by means of a coil spring 88. When electrical power is supplied to the solenoid coil 92 the magnetic field pulls the plunger 86 downward and the disc 89 seals the opening 90. This shuts off flow shown by dashed line 70. So long as there is power on the coil there is no flow through the pipes 72, 70 and 74. It is clear, of course, that while the valve is in operation and there is fluid in the piston and it has been moved from its uppermost position, the solenoid valve must be connected and the passage through it closed. Whenever the solenoid valve is opened any excess pressure in the cylinder is reduced to zero and the piston then moves upwardly in accordance with the force of the spring 88.

Figure 3:
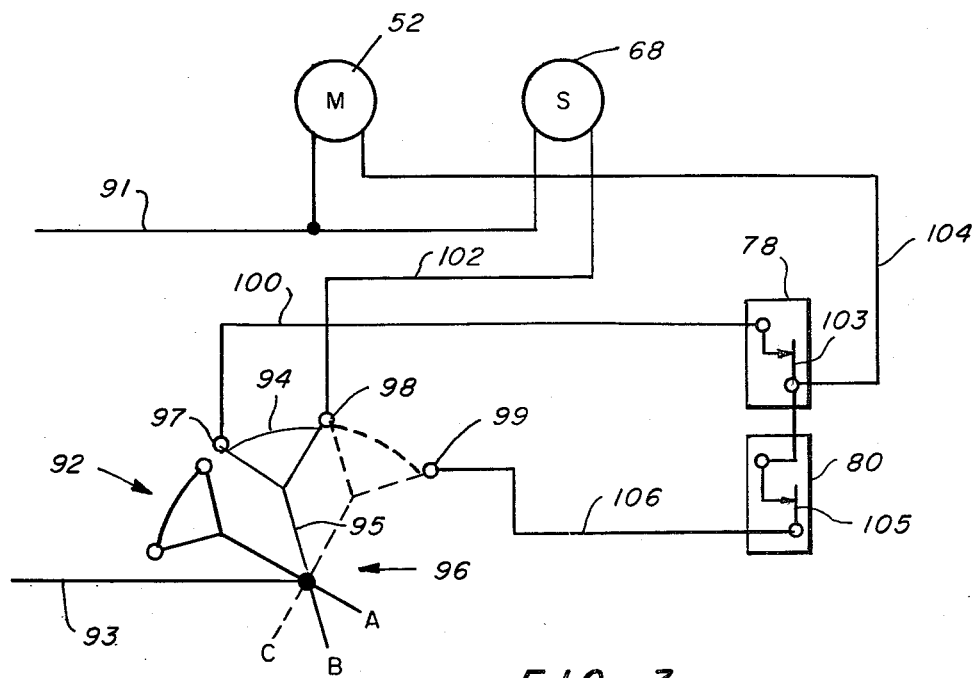
FIG. 3 illustrates a circuit diagram of the power connections to the motor and to the solenoid valve.

Referring now to FIG. 3, the electrical circuit of the control mechanism is shown. The motor which drives the pump is shown as numeral 52 and the solenoid valve shown as numeral 68. Power is supplied through lead 91 to one side of the motor and one side of the solenoid valve. The other line 93 is connected to a switch 96 which has three positions, A, B and C. In position A power is disconnected from the contacts 97, 98 and 99. In position B the line connection 93 goes to the operating arm 95 and is supplied through the blade 94 to contacts 97 and 98. Contact 98 goes to the solenoid valve and is pulled in to seal the pressure in the cylinder. The terminal 97 goes by way of lead 100 to the switch 78 and since the switch has not been opened by the cam 76, power is supplied through the contact 103 through lead 104 to the motor. The motor starts up driving the pump and forcing fluid from the sump into the cylinder, and driving the piston down. This pressure is restrained by the check valve 66. When the cam 76 reaches the switch 78 and opens the contact 103 the motor then stops. The pressure is maintained because each of the check valve and the closed solenoid by-pass valve.

If it is desired to move the gate 30 to the bottom position, the switch 96 is moved to position C where the electrical power from lead 93 goes by blade 94 to contacts 98 and 99. At 98 the power is still supplied to the solenoid which has not been opened. In addition, electrical power to terminal 99 goes by way of lead 106 to the switch 80, contact 105 and then through lead 104 to the motor. The motor now starts up again, pumping more hydraulic liquid into the cylinder until switch 80 is opened by the cam 76. The gate has now reached its bottom position. The motor is stopped and the cylinder is full of hydraulic fluid.

When it is desired to return the valve to its first position, the switch 96 is now moved to position A in which electrical power is removed entirely from the motor and the solenoid. The solenoid opens, causing a flow of fluid from the cylinder to the sump permitting the piston to move to its uppermost position.

While the valve illustrated is one in which the closure means is adapted to move axially under the force exerted by the piston rod, it will be understood that the control means described can be utilized with valves having other closure systems, such as gate valves, globe valves, butterfly valves, etc.

It will be understood that in a one outlet valve only a single limit switch would be utilized.

It will be clear from the above description that the tubular construction of the gate prevents any net axial force on the gate due to the pressure of the controlled fluid. The only reaction force on the actuating mechanism is due to the fluid pressure on the cross section of the actuating rod. This reaction force is small, so that a low power actuator is all that is needed to operate the valve.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. An electrically actuated flow control valve comprising:
   a valve body having a fluid inlet and at least one fluid outlet and a cylindrical bore therethrough;
   a gate member slidably received in said bore and adapted to selectably close or open said valve;
   an actuator housing having a bottom plate attached to said valve body, the bottom plate having an opening therein coaxial with said valve body cylindrical bore;
   a cylinder mounted in said housing, the cylinder providing a cylinder cavity closed at one end;
   a piston reciprocally positioned in said cylinder cavity;
   a piston rod affixed at one end thereof to said piston, the piston rod extending through said opening in said housing bottom plate, the other end of the piston rod being attached to said valve gate member;
   an electrically powered pump positioned within said housing, the pump having a fluid inlet and a fluid outlet, the fluid outlet being connected to said cylinder housing cavity between said closed end and said piston;
   a check valve in said fluid inlet permitting fluid to flow from said pump into said cylinder cavity but prohibiting fluid flow in the reverse direction;
   a closed, variable volume fluid sump container positioned within said housing adjacent said cylinder and said pump;
   a conduit communicating said sump container with said pump inlet;
   an electrically operated bypass valve having a fluid inlet and a fluid outlet;
   a conduit connecting said bypass valve fluid inlet to said cylinder cavity between said closed end and said piston;
   a conduit connecting said bypass valve fluid outlet to said sump container, said sump container, said conduits, said pump, said cylinder cavity between said piston and said closed end, and said valves forming a closed fluid containing system isolated from the interior of said housing; and
   switch means for selectably energizing said pump and said bypass valve to selectably position said piston, and said piston rod to thereby control the position of said valve gate member, said pump, cylinder and switch means being exterior of said sump container.

2. An electrically actuated flow control valve according to claim 1 including:
   a spring positioned within said housing urging said piston towards said cylinder closed end whereby when said bypass valve is opened said piston is automatically moved towards the cylinder closed end.

3. An electrically actuated flow control valve according to claim 1 including:
   limit switch means responsive to the position of said piston and said piston rod to stop said pump and to thereby control the actuated position of said piston rod of at least one preselected position.

4. An electrically actuated flow control valve according to claim 1 wherein said closed variable volume fluid sump is formed of a flexible elastomeric.

5. An electrically actuated flow control valve according to claim 1 wherein said gate member is of cylindrical tubular configuration and wherein said valve body comprises:
   a fluid input section;
   a first fluid output section on a first side of said input section; and
   a second fluid output section on the second side of said input section, the sections being assembled together in leakproof arrangement and having said cylindrical bore therethrough, said cylindrical tubular gate being slidably received in said bore and adapted to selectively close off one of said three sections.

* * * * *